US010990602B2

(12) United States Patent
Bangalore Narayanamurthy et al.

(10) Patent No.: US 10,990,602 B2
(45) Date of Patent: Apr. 27, 2021

(54) METHOD AND SYSTEM FOR GENERATING OPTIMIZED RESPONSE TO USER INPUT

(71) Applicant: Wipro Limited, Bangalore (IN)

(72) Inventors: Vinutha Bangalore Narayanamurthy, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 194 days.

(21) Appl. No.: 16/049,886

(22) Filed: Jul. 31, 2018

(65) Prior Publication Data
US 2019/0384828 A1 Dec. 19, 2019

(30) Foreign Application Priority Data
Jun. 18, 2018 (IN) .............................. 201841022769

(51) Int. Cl.
  *G06F 7/00* (2006.01)
  *G06F 16/00* (2019.01)
  *G06F 16/2457* (2019.01)
  *G06F 16/901* (2019.01)
  *G06F 16/9535* (2019.01)
(52) U.S. Cl.
  CPC .... *G06F 16/24578* (2019.01); *G06F 16/9024* (2019.01); *G06F 16/9535* (2019.01)
(58) Field of Classification Search
  None
  See application file for complete search history.

(56) References Cited

U.S. PATENT DOCUMENTS

| 6,205,456 | B1 | 3/2001 | Nakao |
| 6,807,535 | B2 | 10/2004 | Goodkovsky |
| 8,356,997 | B1* | 1/2013 | Bergeron ................. G09B 7/04 434/323 |
| 9,014,908 | B2 | 4/2015 | Chen et al. |
| 2011/0131491 | A1 | 6/2011 | Lu et al. |
| 2013/0096991 | A1* | 4/2013 | Gardner ............ G06Q 30/0623 705/7.42 |
| 2014/0201345 | A1* | 7/2014 | Abuelsaad .............. G06F 21/60 709/223 |

(Continued)

OTHER PUBLICATIONS

Roy, D., et al., "Automatic Annotation of Learning Materials for E-learning", Department of Computer Science and Engineering Indian Institute of Technology, 2006. 231 pages.

*Primary Examiner* — Tuan A Pham
(74) *Attorney, Agent, or Firm* — Finnegan, Henderson, Farabow, Garrett & Dunner, LLP

(57) ABSTRACT

The present disclosure relates to a method and a system for generating optimized response to user input. The system may receive a user input indicative of a data required by the user. The system identifies one or more keywords based on the user input. The system determines user expertise level based on search graphs generated using the one or more keywords. The system retrieves a plurality of responses relevant to the data based on the one or more keywords. The system assigns a value to each of the plurality of responses based on the user expertise level. The system identifies a base response in one or more responses having the value greater than a threshold value. Finally, the system collates content of the one or more responses excluding the base response with content of the base response, in a pre-defined sequential order, for generating the optimized response to user input.

14 Claims, 5 Drawing Sheets

(56) References Cited

U.S. PATENT DOCUMENTS

| | | |
|---|---|---|
| 2015/0339288 A1 | 11/2015 | Baker et al. |
| 2016/0035237 A1* | 2/2016 | Nealon .................... G09B 7/02 434/353 |
| 2017/0004548 A1* | 1/2017 | Goel .................. G06Q 30/0282 |
| 2017/0163562 A1* | 6/2017 | Abuelsaad ............. G06F 21/60 |

* cited by examiner

METHOD AND SYSTEM FOR GENERATING OPTIMIZED RESPONSE TO USER INPUT

TECHNICAL FIELD

The present disclosure relates to data processing and response generation to user queries. More particularly, but not exclusively, the present disclosure relates to a method and a system for generating optimized response to a user input.

BACKGROUND

A search engine or a web-based search platform is an information retrieval system that discovers, transforms and stores information for retrieving and presenting information in response to user queries. Search engines aim to identify and retrieve resources (e.g., web pages, images, text documents, processes, multimedia content) that are relevant to a user need. In response to a query or input submitted by a user, search engines return a list of search results referring to resources identified as relevant or matching the query. The list of search results is retrieved based on textual annotation. Thus, search results provided for a self-learner or an inexperienced person in a particular field may be too detailed and makes it difficult for the self-learner to comprehend the search results and retrieve the relevant information. Whereas the search results provided for a professional may be too generic, as the professional may be aware of the technical aspects and may require in-depth information for the provided user input. For example, a response provided to a keyword "cognitive computing" probed by an undergraduate user and a professional user in computer technology, are currently same while the requirements for each of them are different. The professional may expect a sophisticated and in-depth information, with example linking with the professional experience. Whereas the undergraduate user may expect a simple explanation.

Few contents in the search results provided by the search engine may be redundant and hence may result in the user spending time on sorting the search results to retrieve the results relevant to the user. The user query may include terms that do not align well with the intentions of the user. For example, if there is ambiguity in the meaning of the query terms, or the term might not convey intent of the user, the search results may not be valid for the user. The search results rendered may be relevant to keywords present in the user query, but the results may not be relevant or may be broader or narrower than the user's subjective needs and expertise level of the user in the data required by the user.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for generating optimized response to user input. The method comprises receiving, by a response generation system, a user input indicative of data required by the user, identifying one or more keywords based on the user input, determining user expertise level based on a result of comparison of a search graph and a reference graph. The search graph is generated based on the one or more keywords and the reference graph is generated based on a domain associated with the data required by the user. Further, the method comprises retrieving a plurality of responses relevant to the data, from a database, based on the one or more keywords. Furthermore, the method comprises assigning a value to each of the plurality of responses based on the user expertise level. The value associated with each response is indicative of a measure of relevancy of the corresponding response to the data required by the user. Thereafter, the method comprises identifying one or more responses having the value greater than a threshold value from the plurality of responses and characterizing one of the one or more responses as a base response and collating content of the one or more responses excluding the base response with content of the base response, in a pre-defined sequential order, for generating the optimized response to the user input.

In an embodiment, the present disclosure discloses a response generation system, for generating optimized response to user input. The response generation system comprises a processor and a memory, communicatively coupled with the processor, storing processor executable instructions, which, on execution causes the processor to receive a user input indicative of data required by the user. Further, the processor identifies one or more keywords based on the user input, determines user expertise level based on a result of comparison of a search graph and a reference graph. The search graph is generated based on the one or more keywords, and the reference graph is generated based on a domain associated with the data required by the user. Thereafter, the processor retrieves a plurality of responses relevant to the data, from a database, based on the one or more keywords. Furthermore, the processor assigns a value to each of the plurality of responses based on the user expertise level. The value associated with each response is indicative of a measure of relevancy of the corresponding response to the data required by the user. Thereafter, the processor identifies one or more responses having the value greater than a threshold value from the plurality of responses and characterizing one of the one or more responses as a base response. Finally, the processor collates content of the one or more responses excluding the base response with content of the base response, in a pre-defined sequential order, for generating the optimized response to the user input.

In an embodiment, the present disclose relates to a non-transitory computer readable medium including instruction stored thereon that when processed by at least one processor cause a response generation system to receive a user input indicative of data required by the user. Further, the processor identifies one or more keywords based on the user input, determines user expertise level based on a result of comparison of a search graph and a reference graph. The search graph is generated based on the one or more keywords, and the reference graph is generated based on a domain associated with the data required by the user. Thereafter, the processor retrieves a plurality of responses relevant to the data, from a database, based on the one or more keywords. Furthermore, the processor assigns a value to each of the plurality of responses based on the user expertise level. The value associated with each response is indicative of a measure of relevancy of the corresponding response to the data required by the user. Thereafter, the processor identifies one or more responses having the value greater than a threshold value from the plurality of responses and characterizing one of the one or more responses as a base response. Finally, the processor collates content of the one or more responses excluding the base response with content of the base response, in a pre-defined sequential order, for generating the optimized response to the user input.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims.

The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
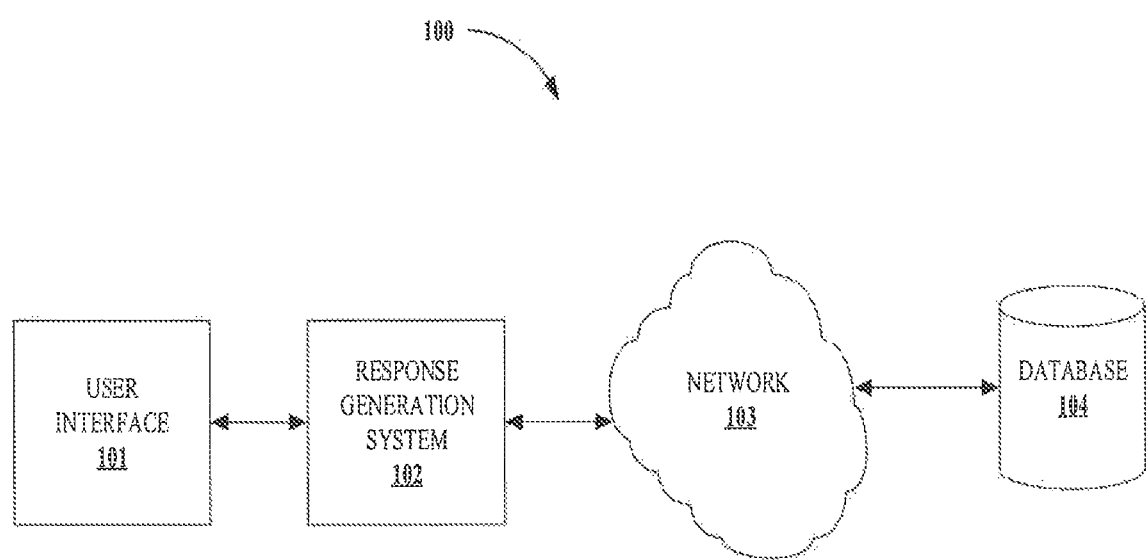
FIG. 1 shows a block diagram illustrative of an exemplary environment for generating optimized response to user input, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for generating optimized response to user input. The system may receive a user input indicative of a data required by the user. The system identifies one or more keywords based on the user input. The system further generates search graphs based on the one or more keywords and domain associated with the data required by the user. Further, the system may determine user expertise level based on the search graphs. Thereafter, the system retrieves a plurality of responses relevant to the data based on the one or more keywords. The plurality of response may be retrieved from a database associated with the system. Furthermore, the system assigns a value to each of the plurality of responses based on the user expertise level. The value associated with each response is indicative of a measure of relevancy to the data required by the user. Thereafter, the system identifies one or more responses having the value greater than a threshold value from the plurality of responses and characterizes one of the one or more responses as a base response. Finally, the system collates content of the one or more responses excluding the base response with content of the base response, in a pre-defined sequential order, for generating the optimized response to the user input.

FIG. 1 shows a block diagram illustrative of an exemplary environment for generating optimized response to user input, in accordance with some embodiments of the present disclosure. The environment 100 includes a user interface 101, a response generation system 102, a database 104 and a network 103 which is connected to the response generation system 102 and the database 104. The user interface 101 may be capable of receiving user input. The user input may be, but not limited to, a user query, generic statements, conversations of the user with the response generation system 102 and the like. The user input essentially describes data required by the user. The response generation system 102 processes the user input and provides an optimized response to the user input. The network 103 communicatively connects the response generation system 102 to the database 104. The response generation system 102 may retrieve data/plurality of response from the database 104 for generating the optimized response to the user input based on user expertise level and relevancy to data required by the user. Also, the response generation system 102 may update the database 104 with the user input and the corresponding response. The updated database may be used to generate a new response for subsequent user input.

In an embodiment, the user interface 101 may be a medium through which user input is received from one or more users. In an embodiment, the user interface 101 may be a part of the response generation system 102 or as a separate unit. In an implementation, when the user interface 101 is a separate unit, it may be connected to the response generation system 102 via a wired or a wireless means. The user interface may include, but is not limited to, a keyboard, a keypad, a touchpad, a mike, a camera, a mouse, a microphone, a touchscreen, a joystick, a stylus, a scanner and any other medium which is capable of receiving the input from the one or more users.

In an implementation the response generation system 102 may be a server. The response generation system 102 may be accessed through one or more user devices (not shown) used by one or more users. In an embodiment, the one or more users may be a person. Further, the user input may be generated by a computing system. The one or more user devices may include, but is not limited to, computing systems, such as a laptop, a computer, a desktop computer, a Personal Computer (PC), a notebook, a smartphone, a smart watch, a wearable device, a tablet, e-book readers. A person skilled in the art would understand that the response generation system 102 may be configured on any other device, not mentioned explicitly in the present disclosure. In another implementation, the response generation system 102 may be configured as a standalone device or may be integrated with the computing systems.

The response generation system 102 may process the user input for generating a response to the user input. The response generation system 102 may identify one or more keywords based on the user input. Based on the one or more keywords and the data required by the user, the response generation system 102 may generate a search graph and a reference graph. The response generation system 102 may determine the user expertise level based on a plurality of user parameters. The response generation system 102 may determine the user expertise level based on the comparison of the search graph and the reference graph. The response generation system 102 may retrieve a plurality of responses relevant to the data required by the user, from the database 104 based on the one or more keywords. The response generation system 102 may assign a value to each of the plurality of responses based on the user expertise level. The value associated with each response is indicative of a measure of relevancy of the corresponding response to the data required by the user. Thereafter, the response generation system 102 may identify one or more responses having the value greater than a threshold value from the plurality of responses and characterizes one of the one or more responses as a base response. The response generation system 102 collates content of the one or more responses excluding the base response with content of the base response, in a pre-defined sequential order, for generating the optimized response to the user input. The pre-defined sequential order may be according to a complexity of content corresponding to the data required by the user. The pre-defined sequential order may be based on requirements of the user.

The database 104 may include a corpus of resources which may include web pages, images, news articles, text documents, sequential set of data, multimedia content on an intranet or the Internet. An indexing unit maintains an index for the resources found in the database 104 and stores index information for the resources. This index information may be used to identify the resources relevant to the user input. The database 104 may comprise a set of domains. For example, the set of domains may be, but not limited to, ontology, politics, tourism, healthcare, sports, etc: Using the knowledge graph, desired response may be retrieved, thus providing accurate results to the user input. The database 104 may comprise data about the one or more keywords extracted from the user input, historical data of user input and based on the data existing in database 104. With the database 104 the one or more users may get information about people, facts and places that are interconnected.

In an embodiment, the response generation system 102 may communicate with the database 104 through the network 103. The response generation system 102 may be disposed in communication with the network 103 via a network interface (not shown). The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The network 103 may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc.

Figure 2:
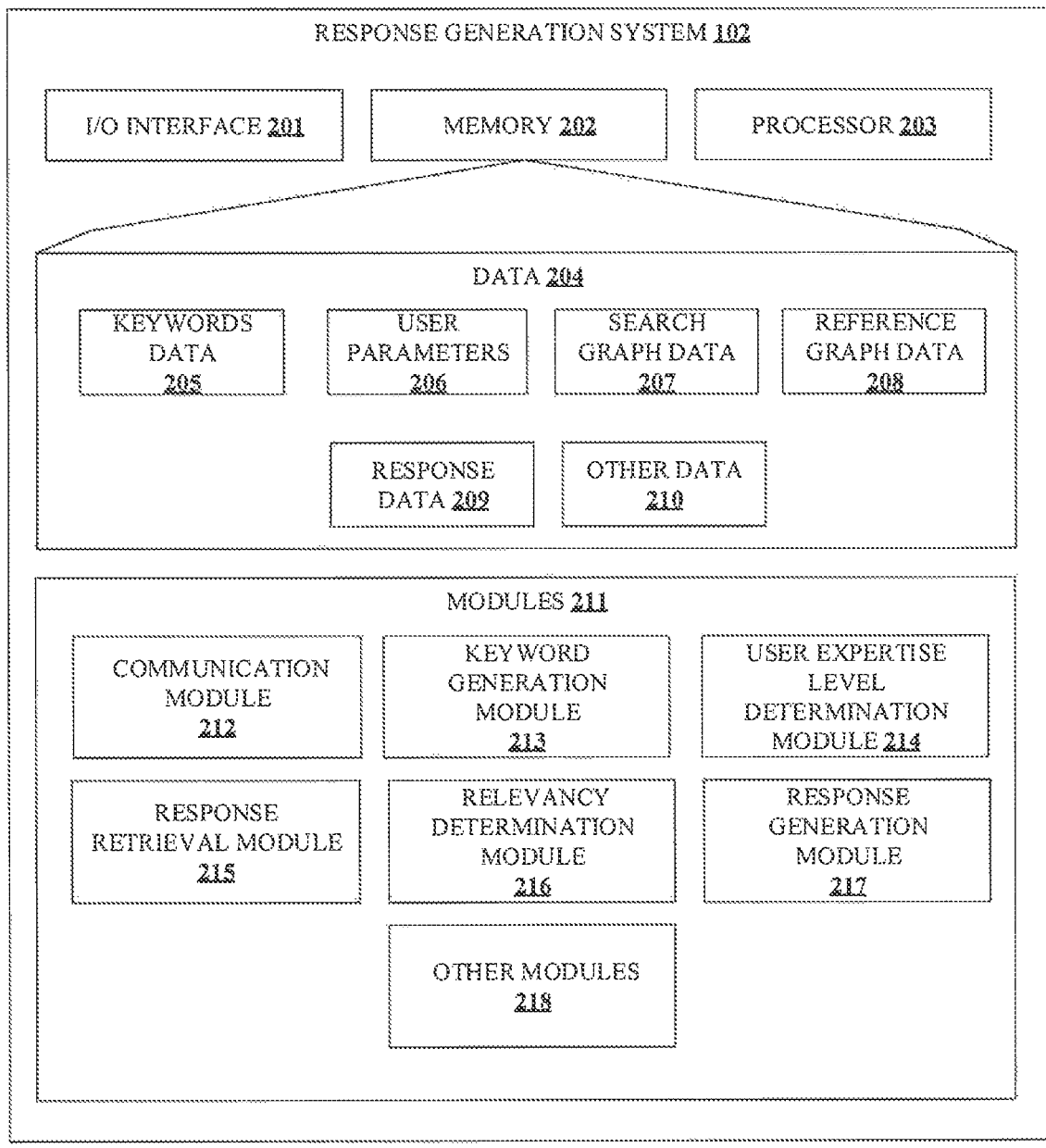
FIG. 2 shows an exemplary block diagram of a response generation system for generating optimized response to user input, in accordance with some embodiments of the present disclosure.

FIG. 2 shows an exemplary block diagram of a response generation system 102 for generating optimized response to user input, in accordance with some embodiments of the present disclosure. The response generation system 102 may include at least one processor 203 and a memory 202 storing instructions executable by the at least one processor 203. The processor 203 may include at least one data processor for executing program components for executing user or system-generated requests. The memory 202 is communicatively coupled to the processor 203. The response generation system 102 further includes an Input/Output (I/O) interface 201. The I/O interface 201 is coupled with the processor 203 through which an input signal or/and an output signal is communicated. In an embodiment, the I/O interface 201 couples the user interface 101 to the response generation system 102.

In an embodiment, data 204 may be stored within the memory 202. The data 204 may include, for example, keywords data 205, user parameters 206, search graph data 207, reference graph data 208, response data 209 and other data 210.

In an embodiment, the keywords data 205 may refer to the one or more keywords generated based on the user input. The one or more keywords may refer to one of implicit keyword and explicit keyword. Explicit keyword is directly derived from the user input. For an instance if the search query is "what is neural network", the explicit keyword may be "neural network". Implicit keyword is derived based on pre-learnt domain knowledge and the data required by the user. For another instance, if the user input is "I have a song stuck in my head" the implicit keyword may be "song" and the explicit keyword may be "music".

In an embodiment the user parameters 206 may include the plurality of user parameters associated with the user. The plurality of user parameters may include, but are not limited to, personal profile of the user and social media profile of the user.

In an embodiment, the personal profile of the user may include information regarding the work profile of user, and the qualification of the user. The personal profile provides crucial information about the user in general. For an instance, if an undergraduate in computer science engineering probes a query regarding "the programming of the Bubble sort in C language", the undergraduate is provided with a different degree of details as compared to a computer science professional working in the industry probing the same query. In addition to providing the different degrees of information, the personal profile also helps in rendering the information with the different rankings. Consider a situation when the plurality of responses retrieved have similar ranking, the personal profile of the user helps in providing the most appropriate results considering the experience of the person in addition to the degree of understanding of the subject matter.

In an embodiment, the social media information of the user provides adequate information about the user and exposure of the user to the different technologies.

In an embodiment, the search graph data 207 refers to the link between the one or more keywords. A sequential link is developed between the one or more keywords identified from the user input.

In an embodiment, the reference graph data 208 may comprise potential keywords related to the domain associated with the data, represented in a sequential order. The reference graph is generated by plurality of techniques which may include origin of the content. In an embodiment, the reference search related to different domains may be present in the database 104. The domain related data for generating the reference graph is obtained from the database 104. Consider an instance, where the user input is "Pythagoras theorem example". The reference graph for the above-mentioned user input may be Pythagoras theorem→illustration→example→application→proof→Apollonius theorem.

In an embodiment, the response data 209 refers to the plurality of responses retrieved by the response generation system 102 from the database 104, based on the one or more keywords. The plurality of responses may be in the form of web pages, link to web pages, Universal Resource Locator (URL), images, or news articles, text documents, processes, multimedia content and the like.

In an embodiment the other data 210 may include, but is not limited to, historical data and search patterns and choice of keywords pertaining to the user. The historical data may refer to data regarding previous user inputs, results and/or responses provided to the previous user input, the choice of keywords and search pattern may refer to the different set of keywords used and the domains the user frequently searches for. For example, a professional in computer science domain may frequently search for coding techniques or computer science related queries.

In an embodiment, the data 204 in the memory 202 is processed by modules 211 of the response generation system 102. As used herein, the term module refers to an application specific integrated circuit (ASIC), an electronic circuit, a Field-Programmable Gate Arrays (FPGA), Programmable System-on-Chip (PSoC), a combinational logic circuit, and/or other suitable components that provide the described functionality. The modules 211 when configured with the functionality defined in the present disclosure will result in a novel hardware.

In one implementation, the modules 211 may include, for example, a communication module 212, a keyword generation module 213, a user expertise level determination module 214, a response generation module 215, relevancy determination module 216, collating module 217, response generation module 218 and other modules 219.

In an embodiment, the communication module 212 may receive the user input from the I/O interface 201. The user input may be in the form of text, speech, image, audio and the like.

In an embodiment, the keyword generation module 213 may identify one or more keywords from the user input. The keyword generation module 213 may parse the user input and extract one or more keywords from the user input. In an embodiment, the user input may be converted into text format by the keyword generation module 213 before processing the user input. In an embodiment, the response generation system 102 may interact with the user by dynamically probing questions to the user, for improving the user input. Further, the keyword generation module 213 identifies explicit keywords directly from the user input. Implicit keywords are generated based on the pre-learnt domain knowledge associated with the explicit keyword identified in the user input. For an instance, if the user query is "I have an idea, how do I protect it?". The explicit keywords identified may be "idea" and "protect". The keyword generation module 213 generates the implicit keywords. The domain knowledge associated with ideology may relate protection of idea to Intellectual Property. Thereby, the keyword generation module 213 may generate an explicit keyword "Intellectual Property" for the user input.

In an embodiment, the user expertise level determination module 214 may determine the user expertise level of the user. The user expertise level may be indicative of knowledge of the user in the domain associated with the data required by the user. The user expertise level may also indicate a level of understanding of the user in relation to the data required by the user. Consider an instance, where the user query is "what are regression models". Regression models are a part of machine learning techniques. The user expertise level indicates the amount of knowledge the user in regression models. For instance, if the user has partial knowledge on basics of regression models, the user expertise level determination module 214 may determine the user expertise level to be on a medium scale. In another instance, if the user is a novice at regression models, the user expertise level determination module 214 determines the user expertise level to be on a low scale. The user expertise level may be determined based on a result of comparison of the search graph and the reference graph. Further, the user expertise level may be determined based on a weighted sum of plurality of user parameters.

In an embodiment, the response retrieval module 215 may retrieve the plurality of responses based on the one or more keywords and the data required by the user. The plurality of responses may be results relevant to the data required by the user and are retrieved from the database 104.

In an embodiment, the relevancy determination module 216 may assign a value to each of the plurality of responses based on the user expertise level. The value associated with each response is indicative of a measure of relevancy of the corresponding response to the data required by the user. Further, the relevancy determination module 216 identifies one or more responses having the value greater than a threshold value from the plurality of responses. Thereafter, a response of the one or more responses having the greatest value is identified as a base response. The relevancy determination module 216 identifies the base response as the most relevant response among the one or more responses based on the user expertise level.

In an embodiment, the response generation module 217 may collate contents of the one or more responses excluding the base response with the contents of the base response in a pre-defined sequential order to generate an optimized response. The response generation module 217 may remove any duplication from the contents of the one or more responses and may collate all the relevant information from the one or more response and the base response in the optimized response. For generating a single content, the one or more responses are compressed by identifying the relevant portions. From the one or more responses relevant portions are identified and collated with the contents of the base response at appropriate places and in a pre-defined sequential order, for generating the optimized response. The pre-defined sequential order may be according to the complexity of content corresponding to the data required by the user. The optimized response may include data collated based on the complexity of data present in the relevant portions of the one or more responses. The optimized response may include an adaptive sequence or flow of content with sources or hyperlinked information. The adaptive sequence may indicate a sequence of data in the optimized response.

In an embodiment, the other modules 218 may include, but are not limited to, a display module, and a feedback module. The display module may be used to display the response provided to the user input. The display module may be one of, but not limited to a monitor, a Liquid Crystal Display (LCD), a Light Emitting Diode (LED) display and/or any other module present which is capable of displaying an output.

In an embodiment, the feedback module may receive feedback from each of the one or more users when an inappropriate response is generated. In an embodiment, the one or more users may reword the corresponding user input when an inappropriate response is generated. The rewording of the corresponding user input may be considered as the feedback.

Figure 3:
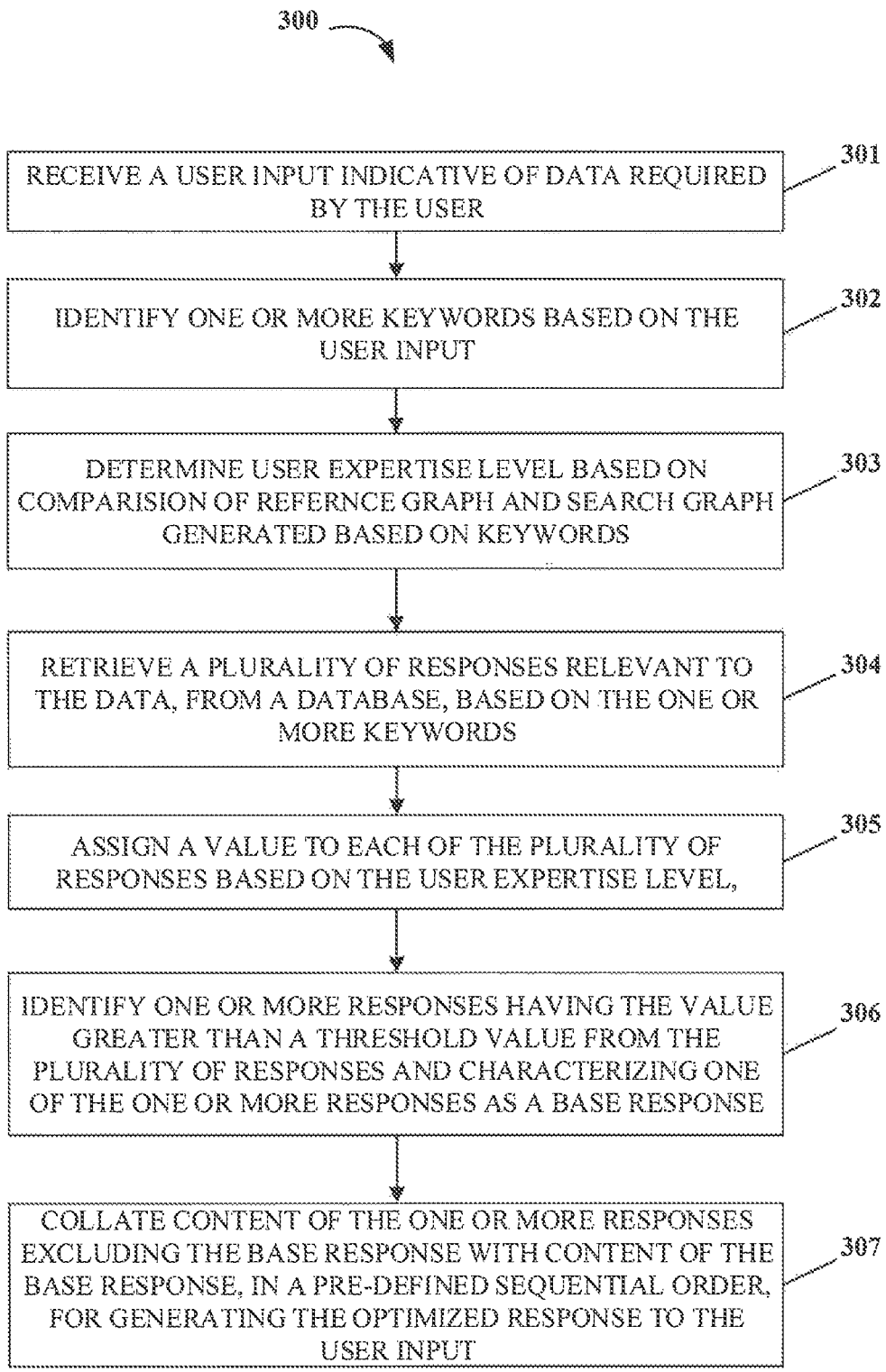
FIG. 3 shows an exemplary flow chart illustrating method steps for generating optimized response to user input, in accordance with some embodiments of the present disclosure.

FIG. 3 shows an exemplary flow chart illustrating method steps for generating optimized response to user input, in accordance with some embodiments of the present disclosure;

As illustrated in FIG. 3, the method includes one or more blocks for generating optimized response to user input. The method 300 may be described in the general context of computer executable instructions. Generally, computer executable instructions may include routines, programs, objects, components, data structures, procedures, modules, and functions, which perform particular functions or implement particular abstract data types.

The order in which the method 300 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step 301, the user input may be received by the communication module 212. The user input may be, but not limited to, user query, generic statements, conversations of the user with the system or other humans, and the like. The user input essentially indicates the data required by the user or the content the searched by the user. The user input may be received from the one or more users. In an embodiment, the one or more users may be a person. Further, the user input may be generated by a computing system. In an embodiment, the one or more users may be a person or a computing system. The user input may be in the form of text, speech, image, audio and the like.

At step 302, the keyword generation module 213 may identify one or more keywords from the user input. The keyword generation module 213 may parse the user input and extract one or more keywords from the user input.

At step 303, the user expertise level determination module 214 may determine the user expertise level based on the result of comparison of the search graph and the reference graph. The search graph is generated based on the one or more keywords and the reference graph is generated based on the domain associated with the data required by the user.

In an embodiment, the user expertise level determination module 214 may determine the degree or level of understanding of the user by probing questions to the user based on the user input received. A conversation or an interaction with the user may be used to capture requirements of the user. The answers provided by the user to the questions will help the user expertise level determination module 214 understand the requirements of the user in a better way. Consider an example, the user input is "Recurrent Neural Network". To determine the degree of understanding of the user, there may be interaction between the response generation system 102 and the user through a Human Machine Interface (HMI) platform. Based on the interaction, the user expertise level determination module 214 may then infer the level of understanding of the user regarding the desired information. The level of understanding of the user is indicative of the expertise level of the user.

Consider an instance, the keywords present in the user input is "machine learning" and "SVM based classifier". The impression on the user expertise level, from the choice of keywords, when looked together, indicates that the user may not be an expert and may be a beginner in the context of machine learning. Thereby, the first phrase "machine learning" is not required and "SVM based classifier" may be sufficient to obtain the relevant results (similar to omitting the keyword "science" in the user input "science"+"Newton's laws of motion"). In another instance, the user may have wanted to know about role of "SVM based classifier" in "machine learning" and may have not used the keyword "role". The user expertise level determination module 214 may converse with the user to determine the user expertise level or to determine the level of understanding of the user. A sample conversation between the response generation system 102 and the user may be as illustrated in Table 1.

TABLE 1

| | |
|---|---|
| System 102 | Would you like to know more about machine learning or classifiers in addition to "SVM based classifier" |
| User 1 | Yes, that helps |
| User 2 | Right, my focus is on "SVM based classifier" |
| User 3 | I am new to this field. But want to know about "SVM based classifier" |

For the user 1, user 2 and user 3, the response generation system 102 provides a little information on machine learning, a little more on classifiers and then elaborated information (documents/links/section) on "SVM based classifier".

Another instance of conversation between the user and the response generation system 102 is as illustrated in Table 2.

TABLE 2

| | |
|---|---|
| System 102 | Would you like to know more about machine learning or classifiers in addition to "SVM based classifier" |
| User 4 | No |
| System 102 | you are interested only in "SVM based classifier"? |
| User 4 | yes |

Based on the conversation with user 4, the response generation system 102 may provide adequate information on "SVM based classifier" with less weightage to basics and more weightage to advanced topics.

Another instance of conversation between the user and the response generation system 102 is as illustrated in Table 3.

TABLE 3

| | |
|---|---|
| System 102 | Would you like to know more about machine learning or classifiers in addition to "SVM based classifier"? |

TABLE 3-continued

| | |
|---|---|
| User 5 | No |
| System 102 | you are interested only in "SVM based classifier"? |
| User 5 | No |
| System 102 | Please rephrase the search query. Unable to understand why "machine learning is mentioned explicitly with "SVM based classifier" |
| User 5 | I believed that SVM comes under machine learning |

Based on the conversation with user 5, the response generation system 102 may provide adequate information on "SVM based classifier" and some information on machine learning and classifier considering that the user 5 is a beginner in the domain.

In an embodiment, the user expertise level may be determined based on the value generated based on the comparison of the search graph and reference graph. In an embodiment the search graph is generated based on the one or more keywords. The one or more keywords identified from the user input is used for generation of search graph. The one or more keywords identified may change dynamically based on the varying user input. For example, if the user is not able to obtain the results the user is expecting, then the user may use the same keywords after all the options of the search gets exhausted. The search graph is created using the one or more keywords identified from the user input in each search carried out by the user. The search graph comprises of one or more keywords in the chronological order of traversal. The search graph is further compared with the reference graph. The comparison of the search graph generated based on the one or more keywords and the reference search graph captures the user requirements, provides important information on what the user is really looking for.

The one or more keywords identified are indicative of content the user is looking for, the one or more keywords identified do not provide the adequate insight to the user expertise level. In one embodiment, the keywords provided by the user in subsequent searches in a session are to be linked in an order and compared with the complexity of content search provided by the reference graph. For example, if the user input is "details on convolutional neural networks (CNN)" and "comparison of architectures of CNN" in the same or two consecutive searches, the response generation system 102 queries the user to check if the user is aware of different architectures of CNN, in order to understand the comparison of architectures of CNN. The reference search graph in the context may be Neural Network→types of neural network→Convolutional neural network (CNN)→architectures of CNN→comparison of architectures of CNN. By comparing the search graph with the reference graph, the user's level of understanding is determined. For example, an user's search input as "details on convolutional neural networks (CNN)" would most likely signify a beginner or novice. While an user searching for "comparison of architectures of CNN" may be indicative that the user is aware of the basics of CNN and different types of CNN architectures.

The reference graph may be generated automatically using a plurality of techniques, which may include origin of the content (e.g. IEEE transactions on Neural networks, "Machine learning for beginners"; title speaks volumes), intended audience (for a lay man e.g. "machine learning for dummies", "advanced deep learning") etc.

Figure 4:
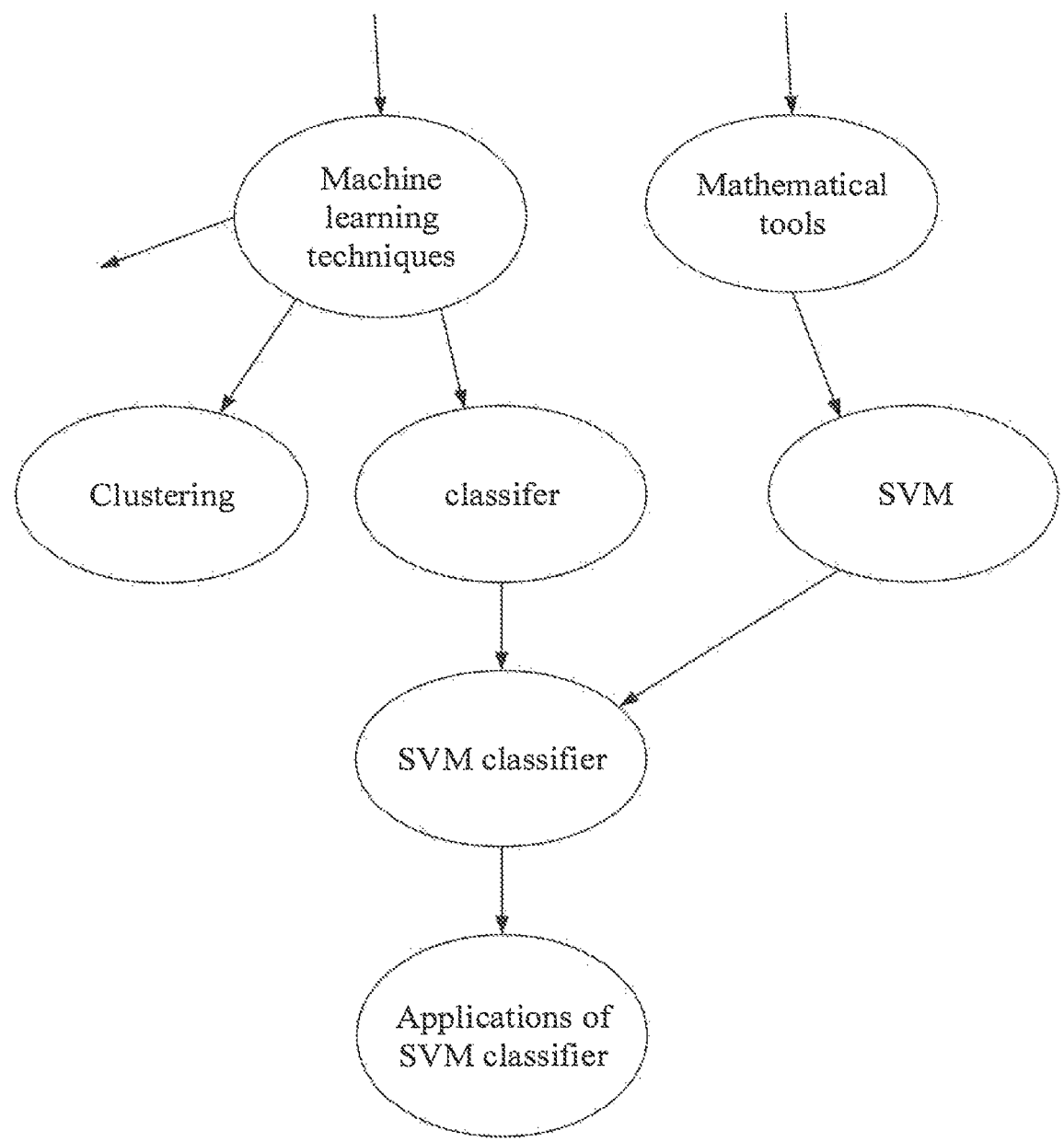
FIG. 4 illustrates a part of a reference graph, in accordance with some embodiments of the present disclosure.

The reference graph is generated and stored in the database 104, before the search for the content is made. In an embodiment, the reference graph may be generated by using Bayesian networks. The reference graph comprises two parameters, terms in the graph (nodes) and sequence of the appearance of the nodes. FIG. 4 illustrates a part of a reference graph generated and stored in the database 104. The reference graph as illustrated in FIG. 4 comprises nodes related to machine learning techniques. The nodes may indicate keywords which may be used by a user in the user input. The reference graph also indicates the order of traversal between the nodes. The nodes may be populated based on plurality of sources, which may include index terms and Table of content (ToC) appearing in the books, monograms, journal papers etc. The index terms may refer to headings and sub-headings appearing in the books, monograms, journal papers etc. Each node is assigned with a maturity index based on the source document from which the nodes are considered. The maturity index indicates a weight assigned to each of the nodes. If keywords corresponding to the nodes appear in more than one document, the weighted sum is assigned. For example, when a user queries for "artificial intelligence for dummies", the term "LSTM" may appear in only source document/source page. Thus, "LSTM" may not be much relevant to the query. However, if the term "LSTM" has appeared in more than one source document (10 source documents), then the term "LSTM" may be considered as having a more weight as it is appeared in more documents. The term "LSTM" may be represented as a node in the reference graph and a weight may be assigned to the node. The node LSTM may be assigned with a weight of 6 in a scale of 1 to 10 based on frequency of appearance in one or more source documents, number of downloads/citations of the one or more source documents etc. For example, the term "LSTM" may be appeared in an article. The same term can also appear in a research article in IEEE transactions on Neural Networks for 10 times. The maturity index may be assigned with a weight of 7 based on reviews, downloads of the research article etc. The maturity value of LSTM becomes (7*IEEE weight+ 6*book weight)/2 (7*.9+6*.8=0.56). The books/journals/ monograms themselves are assigned a weightage based on title, number of downloads, reviews etc.

Thus, LSTM forms a node in the reference graph. The subsequent nodes are derived from the flow of content in the article/book/monogram etc. For example, LSTM may appear in introduction section of the IEEE publication. "Speech coding with LSTM" may be the next section. The keyword "speech coding" forms the next node. Speech coding may get the maturity index in a similar way as LSTM. Highly specialised topics such as "speech coding with LSTM" may not be well quoted in literature. Therefore, additional parameters such as number of times "speech coding with LSTM" is searched and profile of the searching user are assigned with higher weightage. Thus, multiple paths may originate from each node. A path among the multiple paths least used by the user or least significant (in terms of length i.e. number of nodes or sum of maturity indices) may be omitted. Multiple paths may be merged if the paths have common nodes. Thus, reference graphs are prepared along with weightages for nodes, organised in the order of increasing maturity.

In an embodiment, the user expertise level determination module 214 compares the reference graph and the search graph semantically to determine the user expertise level. The number of nodes in reference graph and the search graph generated for the user query are compared. The difference between the number of nodes in the reference graph and the search graph may be used for estimating the difference between the search graph and the reference graph. For example, if the user queries/searches for the content in the same order of the reference graph, starting from node A to node B (assuming the reference graph has two nodes node A and node B), the match is 100%. A search maturity index is assigned to the user input (the search maturity index is same as the one indicated by node B, the last node in user input). Absence of specific keywords in the user input is an indication of the lack of familiarity of the domain or a medium level of user expertise level. The number of positions the nodes in reference graph and the search graph differ adds to the distance. In one implementation, a reversal of order of traversal in comparison with the reference graph is assigned a weightage of 0.5. Consider FIG. 4. In an instance if the user input is "SVM classifier" and further user input is "classifier" it leads to reversal of order of traversal in comparison with the reference graph illustrated in FIG. 4. The search maturity assigned to the user input may be reduced by 0.5. Further, if the user input is in the order of "applications of SVM classifier", "SVM classifier" and "classifier" the order of traversal is further reversed (in comparison to the reference graph illustrated in FIG. 4). The maturity index assigned to the user input is further reduced to 0.25 (1-0.5-0.25). Based on the maturity index assigned to the user input, the response generation system 102 may determine the user expertise level. In an example, based on user's expertise, a search graph can be taken forward from a specific node onwards.

For example, for the user input "Pythagoras theorem example", the reference graph may be Pythagoras theorem illustration→example→application→proof→Apollonius theorem. Based on the user input the search graph generated may be Pythagoras theorem→illustration→example. The user expertise level may be considered to be medium. The search for one or more responses may stop at "example of Pythagoras theorem" and does not include proof. The comparison between the search graph and the reference graph may encompass the order in which the content has to be rendered to the user. In an embodiment, the user expertise level may be determined based on the one or more keywords that correspond to the nodes and the depth of the nodes in the reference graph.

In an embodiment, the user may not use the same terms assigned to the nodes present in the reference nodes. The list of synonyms, acronyms which may be used for each the nodes may be present in the database 104. The terms associated with the nodes may be replaced with the equivalent terms through use of one of wordnet™, Thesaurus™ and the like. For example, the user input may also come in natural language form such as "Recurrent neural network for voice compression". The user expertise level determination module 214 may employ Natural Language Processing (NLP) for extracting semantically similar phrases/utterances and associates the similar phrases/utterances with the node "LSTM speech coding".

Considering an example, where the user input may be "speech coding with LSTM". In this case the expertise of the user or level of understanding of the may be taken as up to "LSTM speech coding". Thus, by the user's search for LSTM and then LSTM speech coding it may be inferred that the user may understand LSTM, and the precursors topics such as Neural networks, RNN etc can be omitted from the final result presentation to the user. The response to the user may thus focus on LSTM and LSTM speech coding in increasing order. If the user input comprises of semantically closer equivalents such as, "Recurrent neural network for voice compression", the user expertise level may reduce. The focus may now be on RNN as well (since the user input is requesting for RNN). Therefore, the search graph will now be equivalent to RNN→LSTM→LSTM speech coding. As LSTM is a variant of RNN, the one or more responses may be retrieved with increasing focus i.e. more articles are taken on LSTM speech coding than on RNN during collation. At step 304, the response retrieval module 215 may retrieve the plurality of responses corresponding to the implicit keywords and the explicit keywords. The plurality of responses relevant to the content are retrieved from the database 104.

At step 305, the relevancy determination module 216 may assign a value to each of the plurality of responses based on the user expertise level. The value associated with each response is indicative of a measure of relevancy of the corresponding response to the data required by the user. The documents are assigned with the value to indicate expertise levels. Each of the plurality of responses may be ranked based on the source of the document and the response indicating most relevant content in connection to the user expertise level. (e.g. a weight of 0.9 may be assigned for an IEEE response). It is extended to sections of the documents. The sections of documents are linked to user expertise level (complexity) and overall ranked based on the degree of matching of multiple sections. i.e. if multiple sections of a response matches with user expertise level, the document may be ranked high. The relevancy determination module 218 considers rating of the document got from review comments (ratings).

At step 306, the relevancy determination module 216 identifies one or more responses among the plurality of responses having the value greater than the threshold value. Among the one or more responses, the response with the highest rank may be considered as the base response. The base response may be referred as a base document. Contents of the base response may be organized to generate the optimized response. The optimized response may be a document having most relevant content in a sequenced order. In an embodiment, the base document may be identified based on plurality of parameters. Base document may be a document having maximum amount of content retained under a section or sub section, as it is, without deletion. For example, if the user searches for tutorial in machine learning, "Coursera" course documents may be used as base documents (if the document ranks higher than other self-contained courses in terms of matching with user expertise level, review comments on social media etc).

At step 307, the response generation module 217 generates the optimized response in a single view content by collating the contents of the base response, with the contents of the remaining one or more responses/documents. The remaining one or more documents may be referred as auxiliary documents hereafter in the present disclosure. A content graph is generated based on the keywords, sections & subsections etc. for each of the auxiliary documents. The content graph reflects a degree of matching of user requirement, derived from semantic matching of search keywords, user query pattern and expertise level. The content graphs of the auxiliary documents are compared, and common sections are extracted. Further, duplicate sentences are deleted at conceptual level. For example, if two documents are illustrating a concept with same or very similar illustrations, only one of them (preferably from the base document) is retained. If any additional information or illustration exist in the auxiliary documents, the sections are copied in to the base document along with reference URL, page number or section heading. The content from the auxiliary documents may be either considered or discarded and may not be altered. To the content of the base document, the contents from the auxiliary documents that are relevant under the said section may be added in chunks without altering the content. For example, an additional figure and its illustration from one of the auxiliary documents may be appended contextually to make the content of the base document complete and self-contained. The content of base document may be altered. The part of the content already known to user, as estimated from the user expertise level, gets discarded in the base document. Hyperlink to the documents may be provided in the base document.

Consider an instance, where the user input is "classifier and its applications". A first document retrieved from the database 104 may contain details on classifier, types of classifiers T1, T2, applications of T1 classifier and T2 classifier (This information is derived from one or more of the factors such as table of content, index terms, section and sub section heading). Further, a second document retrieved from the database 104 may contain (block diagram of classifier, Type of classifier T3, application of T3. The first document may be considered as base document considering its match to user request, number of downloads, category, social media reviews etc. To the base document, Type of classifier T3, application of T3 from the second document may be added at the required place (under the sections types and applications respectively). The sequential order may be determined based on the reference graph. Further, the reference graph comprises keywords which are explicitly mentioning in certain reference documents. The optimized response may contain state of the art information as new sub sections (such as PCA based classifier) that may not be found in the reference graph. Since, thousands of research documents are generated every day, the reference graph may be updated periodically.

In an embodiment, the similarity between two figures in the one or more documents may be estimated based on features. In one implementation, a Convolutional Neural Network (CNN) may be used to compare the features of two figures or images. A threshold may be applied for considering the two figures to be similar or different. The similarity between two tables is estimated by semantically comparing their titles as well as the headings of different rows and columns.

In an embodiment, to generate the optimized response, the summarized content of the base response may be sequenced as per the sequence graph starting from the basic information to complex objects to comprehend. A sequence graph derived from multiple sources such as the headings and Sub headings (for example, no publication would first provide the proof for Pythagoras theorem and then provide statement of the theorem) may be used for organizing the contents of the base document. The section & subsection of the base document may be organized with increase in complexity. The sequence graph obtained from multiple sources may be fused. The fusion of the graph happens through a plurality of techniques. In one embodiment, Bayesian fusion is used. In another embodiment, the steps used for the collation of the document are used, with documents replaced by sequence terms. The summarized collated content is then placed in the order of the sequence graph in the base document for generating the optimized response. The 218 renders the base document as the optimized response to the user input.

In an embodiment, the reference graph may be generated based on the index terms, headings, sub-headings present in document retrieved from several sources. When there may be more than one document under a domain (such as machine learning) the reference graphs may be merged. Initially, a base reference graph may be identified corresponding to the document based on at least one of the rating/user feedback, number of downloads, number of times the document is accessed. The base reference graph may be populated with missing terms from the graphs of other documents, the missing terms obtained from the other document may be added at right place in the base reference graph. Consider and example, the base graph may contain the hierarchy Machine learning→operations in machine learning→classification (& clustering, regression etc)→Applications of classification. Another document may come with the hierarchy Classifier type→Support vector machines→Regularisation & Non-regularisation→margin estimation. Further, a merged reference graph may be generated as Machine learning→operations in machine learning→classification (& clustering, regression etc) classifier types (Support vector machines→Regularisation & Non-regularisation→margin estimation other types of classifier such as Naïve Bayes classifier appear at the same level of hierarchy as that of SVM based classifier)→Applications of classification Fusion of the graphs may be carried out using Bayesian fusion. The probabilities of including/discarding a node (term) in the merged graph may be obtained by considering the frequency of access of a document/term in the document and user search patterns. Considering an instance user may search about "support vector machines" before searching "applications of support vectors". Thereby, the probability of including "applications of support vectors" given that "support vector machines" is in included is equal to the fraction of the users who searches with both the key words. Consider an example, the user input is "I have an idea. How do I protect it". The response retrieval module 215 retrieves plurality of responses as indicted in the below table, Table 4. Each of the plurality of responses may be ranked based on historical search, relevance, expertise level as shown in the Table 4.

TABLE 4

| SN | rank | link | remark |
| --- | --- | --- | --- |
| 1 | ... | ... | ... |
| 2 | ... | ... | ... |
| 3 | 3 | http://www.link1.com | Gives definition of Patent, IP etc. provides illustrations |
| 4 | 1 | http://www.link2.com | Explains technique of filing |

Based on the ranking shown above in Table 3, a reference graph may be derived adaptively from these documents. The reference graph may be definitions→differences→method of filing→rules and procedures.

The parts of the text extracted from the two different documents (document 3 and document 4) as in below table, Table 5.

TABLE 5

"For eligibility of protection under Intellectual Property Laws, the idea must first be novel and has to be materialized. The idea may not be patented if it is a vague and hypothetical concept."

"Patent protection refers to the right of the owner of the patent. The owner of the patent has complete right over the patent and the invention for which patent is granted cannot be practiced commercially or distributed without consent of the owner of the patent. The person TABLE 5-continued who infringes the patent may be penalized by the court in the jurisdiction corresponding to the country in which the patent is granted. The court holds the authority to stop a patent from being infringed. The rights on declaring the patent invalid is vested in the hands of the court. The court may declare a patent invalid upon successful challenge by a third party. Patent is granted for such ideas that are not hypothetical but implementable"
"An applicant may file a provisional patent application as soon as practical. The filing of the provisional patent application helps in claiming a priority date over the other potential applications which may be filed later to the filing of one's provisional patent application. Many countries have transitioned from a "first-to-invent" to a "first-to-file" invention system. Therefore, the provisional patent application serves as an invention date. After filing of a provisional patent application, the Applicant will have a time of one year from the date of filing the provisional patent, to file a complete patent application of a utility patent. Most inventors use this one-year grace period to further reduce their idea to practice.
"xyz should make arrangement to file the patent applications in all desired countries within one year from first filing date (priority date). This is to secure the priority date and novelty of xyz's patent application. Priority date is known as the first filing date of one patent application, for the purpose of examining the novelty and inventive step of one invention.""

Once the extracted information is received, duplicate information may be removed from the extracted information and collation may be performed on the extracted information. The collated information may be, as indicated in the Table 6.

TABLE 6

~~"you should file a provisional patent application. After filing the provisional application, you now have "patent pending" status. You then have one year from this filing data to file for your nonprovisional (utility) patent."~~
~~"you should make arrangement to file the patent applications in all desired countries within one year from first filing data. This is to secure the priority date and novelty~~
"Patent protection refers to the right of the owner of the patent. The owner of the patent has complete right over the patent and the invention for which patent is granted cannot be practiced commercially or distributed without consent of the owner of the patent. The person who infringes the patent may be penalized by the court in the jurisdiction corresponding to the country in which the patent is granted. The court holds the authority to stop a patent from being infringed. The rights on declaring the patent invalid is vested in the hands of the court. The court may declare a patent invalid upon successful challenge by a third party. Patent is granted for such ideas that are not hypothetical but implementable"
"An applicant may file a provisional patent application as soon as practical. The filing of the provisional patent application helps in claiming a priority date over the other potential applications which may be filed later to the filing of one's provisional patent application. Many countries have transitioned from a "first-to-invent" to a "first-to-file" invention system. Therefore, the provisional patent application serves as an invention date. After filing of a provisional patent application, the Applicant will have a time of one year from the date of filing the provisional patent, to file a complete patent application of a utility patent. Most inventors use this one-year grace period to further reduce their idea to practice.
"xyz should make arrangement to file the patent applications in all desired countries within one year from first filing date (priority date). This is to secure the priority date and novelty of xyz's patent application. Priority date is known as the first filing date of one patent application, for the purpose of examining the novelty and inventive step of one invention.""

Further, based on the expertise level of the user, appropriate text may be rendered. For example, if the user is aware of the patent definition etc., the rendered optimized response can be as indicated in Table 7.

TABLE 7

~~"you should file a provisional patent application. After filing the provisional application, you now have "patent pending" status. You then have one year from this filing date to file for your non provisional (utility) patent."~~
~~"you should make arrangement to file the patent applications in all desired countries within one year from first filing date This is to secure the priority date and novelty"~~
~~"Patent protection refers to the right of the owner of the patent The owner of the patent has complete right over the patent and the invention for which patent is granted cannot be practiced commercially or distributed without consent of the owner of the patent. The person who infringes the patent may be penalized by the court in the jurisdiction corresponding to the country in which the patent is granted The court holds the authority to stop a patent from being infringed The rights on declaring the patent invalid is vested in the hands of the court. The court may declare a patent invalid upon successful challenge by a third party. Patent is granted for such ideas that are not hypothetical but implementable"~~
"An applicant may file a provisional patent application as soon as practical. The filing of the provisional patent application helps in claiming a priority date over the other

TABLE 7-continued potential applications which may be filed later to the filing of one's provisional patent application. Many countries have transitioned from a "first-to-invent" to a "first-to-file" invention system. Therefore, the provisional patent application serves as an invention date. After filing of a provisional patent application, the Applicant will have a time of one year from the date of filing the provisional patent, to file a complete patent application of a utility patent. ~~Most inventors use this one year grace period to further reduce their idea to practice.~~ "xyz should make arrangement to file the patent applications in all desired countries within one year from first filing date (priority date). This is to secure the priority date and novelty of xyz's patent application. Priority date is known as the first filing date of one patent application, for the purpose of examining the novelty and inventive step of one invention.""

---

The above-mentioned information is the summarized, collated, organized, concatenated (from at least 2 documents) result rendered based on the user expertise.

In an embodiment, the system and method as discloses in the present disclosure is used in real time to dynamically generate the optimized response to the user based on user requirement and level of understanding.

In an embodiment, the system and method as discloses in the present disclosure presents the optimized response in a single view representation (e.g., a document) that is made up from different search results that are individually relevant for the current search of the user and based on the user expertise level.

In an embodiment, the system and method as discloses in the present disclosure eliminates the duplications and contradictions in the search response.

Computer System

Figure 5:
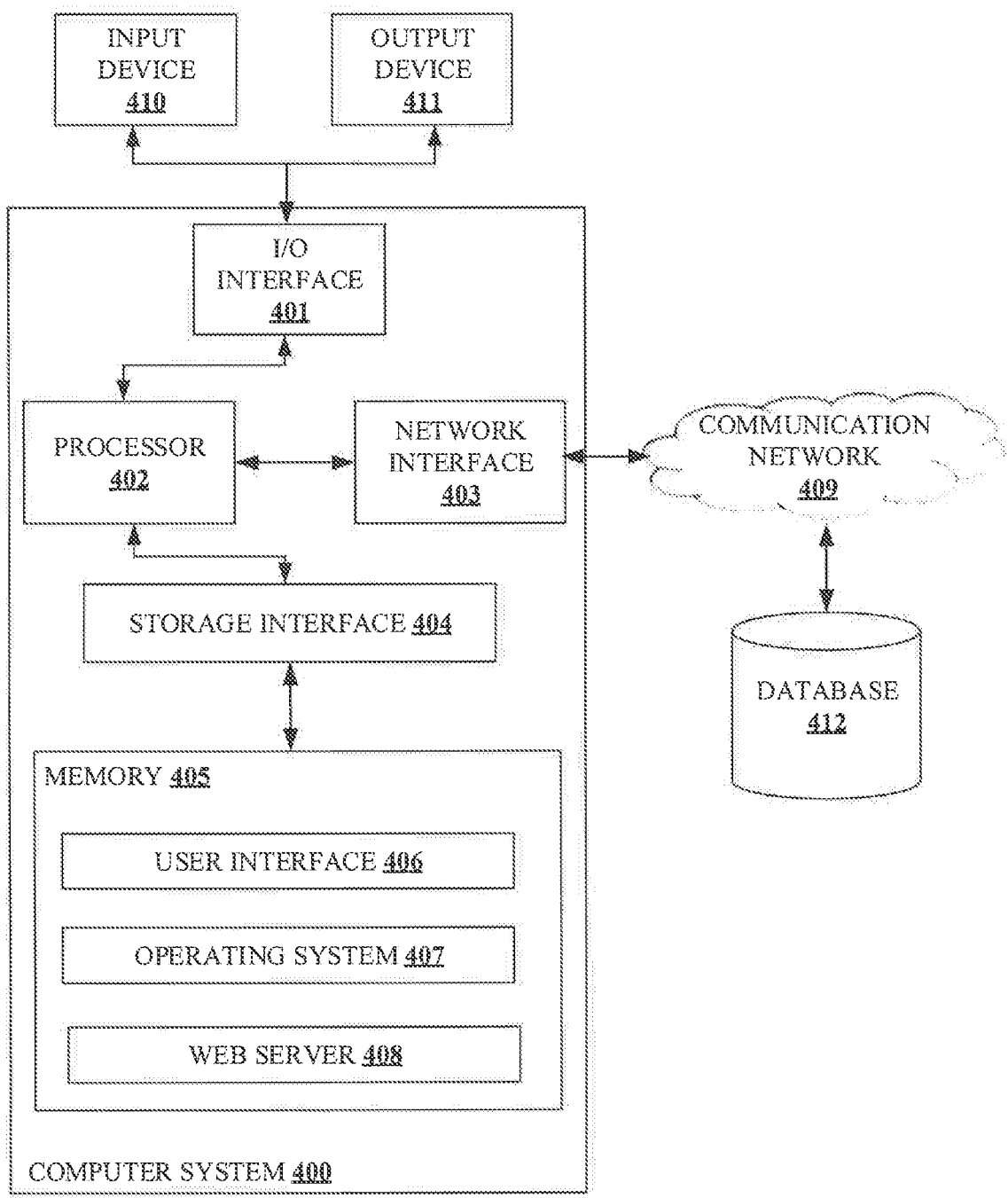
FIG. 5 illustrates a block diagram of a general-purpose computer system for implementing embodiments consistent with the present disclosure.

FIG. 5 illustrates a block diagram of an exemplary computer system 400 for implementing embodiments consistent with the present disclosure. In an embodiment, the computer system 400 is used to implement the response generation system 102. The computer system 400 may include a central processing unit ("CPU" or "processor") 402. The processor 402 may include at least one data processor for executing program components for generating optimizes response to user input. The processor 402 may include specialized processing units such as integrated system (bus) controllers, memory management control units, floating point units, graphics processing units, digital signal processing units, etc.

The processor 402 may be disposed in communication with one or more input/output (I/O) devices (not shown) via I/O interface 401. The I/O interface 401 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 401, the computer system 400 may communicate with one or more I/O devices. For example, the input device 410 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 411 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 400 is connected to the database 412 through a communication network 409. The processor 402 may be disposed in communication with the communication network 409 via a network interface 403. The network interface 403 may communicate with the communication network 409. The network interface 403 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 409 may include, without limitation, a direct interconnection, local area network (LAN), wide area network (WAN), wireless network (e.g., using Wireless Application Protocol), the Internet, etc. Using the network interface 403 and the communication network 409, the computer system 400 may communicate with the knowledge graph 412 and the database 413. The network interface 403 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 409 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 402 may be disposed in communication with a memory 405 (e.g., RAM, ROM, etc. not shown in FIG. 7) via a storage interface 404. The storage interface 404 may connect to memory 405 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface 406, an operating system 407, web server 408 etc. In some embodiments, computer system 400 may store user/application data 406, such as, the data, variables, records, etc., as described in this disclosure. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLE® ANDROID™, BLACKBERRY® OS, or the like.

In some embodiments, the computer system 400 may implement a web browser 408 stored program component. The web browser 408 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX™, DHTML™, ADOBER FLASH™, JAVASCRIPT™, JAVA™, Application Programming Interfaces (APIs), etc. In some embodiments, the computer system 400 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated method of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
| --- | --- |
| Reference number | Description |
| 100 | Environment |
| 101 | User Interface |
| 102 | Response generation system |
| 103 | Network |
| 104 | Database |
| 201 | I/O interface |
| 202 | Memory |
| 203 | Processor |
| 204 | Data |

-continued

REFERRAL NUMERALS:

| Reference number | Description |
|---|---|
| 205 | Keywords data |
| 206 | User parameters |
| 207 | Search graph data |
| 208 | Reference graph data |
| 209 | Response data |
| 210 | Other data |
| 211 | Modules |
| 212 | Communication module |
| 213 | Keyword generation module |
| 214 | User expertise determination module |
| 215 | Response retrieval module |
| 216 | Relevancy determination module |
| 217 | Response generation module |
| 218 | Other modules |

What is claimed is:

1. A method for generating optimized response to user input, the method comprising:

receiving, by a response generation system, a user input indicative of data required by the user;

identifying, by the response generation system, one or more keywords based on the user input;

determining, by the response generation system, user expertise level based on a result of comparison of a search graph and a reference graph, wherein the search graph is generated based on the one or more keywords, and the reference graph is generated based on a domain associated with the data required by the user, wherein the search graph indicates a link between the one or more keywords, the reference graph comprises potential keywords related to the domain associated with the data, represented in a sequential order and wherein the search graph and the reference graph are compared semantically for determining the user expertise level, and wherein determining the user expertise level is further based on a plurality of user parameters, wherein a weighted sum of the plurality of user parameters and the result of the comparison of the search graph and the reference graph is used for determining the user expertise level;

retrieving, by the response generation system, a plurality of responses relevant to the data, from a database, based on the one or more keywords;

assigning, by the response generation system, a value to each of the plurality of responses based on the user expertise level, wherein the value associated with each response is indicative of a measure of relevancy of the corresponding response to the data required by the user;

identifying, by the response generation system, one or more responses having the value greater than a threshold value from the plurality of responses and characterizing one of the one or more responses as a base response; and collating, by the response generation system, content of the one or more responses excluding the base response with content of the base response, in a pre-defined sequential order, for generating the optimized response to the user input.

2. The method as claimed in claim 1, wherein the user expertise level is indicative of knowledge of the user in the domain associated with the data.

3. The method as claimed in claim 1, wherein the one of the one or more responses is characterized as the base response when the value associated with the one of the one or more responses is greater than the value associated with the remaining of the one or more responses.

4. The method as claimed in claim 1, wherein the one or more keywords comprises implicit keywords and explicit keywords, wherein the explicit keywords are directly derived from the user input and wherein the implicit keywords are derived based on pre-learnt domain knowledge and the content.

5. The method as claimed in claim 1, wherein determining the user expertise level further comprises dynamically generating queries to the user based on the user input and responses received for the queries.

6. The method as claimed in claim 1, wherein the plurality of user parameters comprises at least one of personal profile of the user, social media profile of the user, search history of the user, search patterns and choice of keywords used by the user.

7. A response generation system, for generating optimized response to user input, said response generation system comprising:

a processor; and a memory, communicatively coupled with the processor, storing processor executable instructions, which, on execution causes the processor to:

receive, a user input indicative of data required by the user;

identify, one or more keywords based on the user input;

determine, user expertise level based on a result of comparison of a search graph and a reference graph, wherein the search graph is generated based on the one or more keywords, and the reference graph is generated based on a domain associated with the data required by the user, wherein the search graph indicates a link between the one or more keywords, the reference graph comprises potential keywords related to the domain associated with the data, represented in a sequential order and wherein the search graph and the reference graph are compared semantically for determining the user expertise level, and wherein determining the user expertise level is further based on a plurality of user parameters, wherein a weighted sum of the plurality of user parameters and the result of the comparison of the search graph and the reference graph is used for determining the user expertise level;

retrieve, a plurality of responses relevant to the data, from a database, based on the one or more keywords;

assign, a value to each of the plurality of responses based on the user expertise level, wherein the value associated with each response is indicative of a measure of relevancy of the corresponding response to the data required by the user;

identify, one or more responses having the value greater than a threshold value from the plurality of responses and characterizing one of the one or more responses as a base response; and collate, content of the one or more responses excluding the base response with content of the base response, in a pre-defined sequential order, for generating the optimized response to the user input.

8. The response generation system as claimed in claim 7, wherein the user expertise level is indicative of knowledge of the user in the domain associated with the data.

9. The response generation system as claimed in claim 7, wherein the one of the one or more responses is characterized as the base response when the value associated with the one of the one or more responses is greater than the value associated with the remaining of the one or more responses.

10. The response generation system as claimed in claim 7, wherein the one or more keywords comprises implicit keywords and explicit keywords, wherein the explicit keywords are directly derived from the user input and wherein the implicit keywords are derived based on pre-learnt domain knowledge and the content.

11. The response generation system as claimed in claim 7, wherein determining the user expertise level further comprises dynamically generating queries to the user based on the user input and responses received for the queries.

12. The response generation system as claimed in claim 7, wherein the plurality of user parameters comprises at least one of personal profile of the user, social media profile of the user, search history of the user, search patterns and choice of keywords used by the user.

13. A non-transitory computer readable medium including instructions stored thereon that when processed by at least one processor cause a response generation system to perform operations comprising:
- receiving a user input indicative of data required by the user;
- identifying one or more keywords based on the user input;
  - determining user expertise level based on a result of comparison of a search graph and a reference graph, wherein the search graph is generated based on the one or more keywords, and the reference graph is generated based on a domain associated with the data required by the user,
  - wherein the search graph indicates a link between the one or more keywords, the reference graph comprises potential keywords related to the domain associated with the data, represented in a sequential order and wherein the search graph and the reference graph are compared semantically for determining the user expertise level, and
  - wherein determining the user expertise level is further based on a plurality of user parameters, wherein a weighted sum of the plurality of user parameters and the result of the comparison of the search graph and the reference graph is used for determining the user expertise level;
- retrieving a plurality of responses relevant to the data, from a database, based on the one or more keywords;
- assigning a value to each of the plurality of responses based on the user expertise level, wherein the value associated with each response is indicative of a measure of relevancy of the corresponding response to the data required by the user;
- identifying one or more responses having the value greater than a threshold value from the plurality of responses and characterizing one of the one or more responses as a base response; and
- collating content of the one or more responses excluding the base response with content of the base response, in a pre-defined sequential order, for generating the optimized response to the user input.

14. The medium as claimed in claim 13, wherein the user expertise level is indicative of knowledge of the user in the domain associated with the data.

* * * * *